(12) United States Patent
Schang et al.

(10) Patent No.: US 7,600,778 B2
(45) Date of Patent: Oct. 13, 2009

(54) AIRBAG MODULE

(75) Inventors: Benoit Schang, Viroflay (FR); Anders Palo, Göteborg (SE)

(73) Assignee: Autoliv Development AB, Vargarda (SE)

( * ) Notice: Subject to any disclaimer, the term of this patent is extended or adjusted under 35 U.S.C. 154(b) by 293 days.

(21) Appl. No.: 11/579,856

(22) PCT Filed: May 4, 2005

(86) PCT No.: PCT/EP2005/004865

§ 371 (c)(1), (2), (4) Date: Nov. 7, 2006

(87) PCT Pub. No.: WO2005/110820

PCT Pub. Date: Nov. 24, 2005

(65) Prior Publication Data

US 2007/0216145 A1    Sep. 20, 2007

(30) Foreign Application Priority Data

May 7, 2004    (DE) .................... 10 2004 022 740

(51) Int. Cl.
*B60R 21/16*    (2006.01)
*B60R 21/20*    (2006.01)

(52) U.S. Cl. .................... 280/730.2; 280/736; 280/740; 280/742

(58) Field of Classification Search ................ 280/736, 280/730.2, 740, 742
See application file for complete search history.

(56) References Cited

U.S. PATENT DOCUMENTS

| 5,172,933 | A | * | 12/1992 | Strasser ...................... 280/740 |
| 5,536,041 | A | | 7/1996 | Acker et al. |
| 6,106,006 | A | | 8/2000 | Bowers et al. |
| 7,243,941 | B2 | * | 7/2007 | Charpentier et al. ........ 280/729 |

FOREIGN PATENT DOCUMENTS

| EP | 0855316 A1 | 7/1998 |
| WO | WO02/079008 A1 | 10/2002 |
| WO | WO 2004/067337 A1 | 8/2004 |

* cited by examiner

*Primary Examiner*—Ruth Ilan
(74) *Attorney, Agent, or Firm*—Brinks Hofer Gilson & Lione

(57) ABSTRACT

An airbag module comprising a planar airbag and an elongate gas generator including discharge ports at least partially extending into the airbag. The airbag includes two side walls connected together by an edge region and made of fabric. An opening is disposed in the edge region of the airbag. The gas generator extends through the opening such that an elongate first section of the gas generator is arranged inside the gas bag. A gas-conducting element protects the fabric and is located in the airbag adjacent the opening. The gas-conducting element is made of plastic and includes a forward section having an arcuate cross section including an opening formed between at least two substantially parallel legs.

15 Claims, 6 Drawing Sheets

AIRBAG MODULE

CROSS REFERENCE TO RELATED APPLICATIONS

This application claims priority to German patent application serial number 102004022740.3 filed May 7, 2004 and PCT/EP2005/004865, filed May 4, 2005.

BACKGROUND OF THE INVENTION

1. Field of the Invention

The invention relates to an airbag module for use in a motor vehicle.

2. Description of the Related Art

Side curtain airbags and other side airbags are used to protect vehicle passengers in the event of a side impact or a vehicle rollover accident. Side curtain airbags are disposed on the roof pillar of the vehicle and when inflated cover at least one side window and, if necessary, the B-pillars of the vehicle. These airbags are particularly designed for providing protection for an occupant's head and upper torso. Another type side airbags may also be disposed in the vehicle seat and, when needed, inflate between the passenger's upper body and the side vehicle structure. These two airbag types have in common that they are built planar with two side walls connected by an edge region, in contrast to front airbags, which are generally pillow-shaped. In this type of airbag, a gas generator, which is elongated and extends into the airbag through an opening, usually provides the gas supply. To this end, the gas generator is disposed partially within and partially outside the airbag. The opening through which the gas generator extends is located in the edge region in which two side walls of the airbag are connected together.

The gas generator is usually elongated. The area of the airbag in which the opening is located is L-shaped. The gas generator extends parallel to the longitudinal direction of the airbag. Since the discharge ports of the usually cylindrical wall of the gas generator are generally disposed rotationally symmetric for safety reasons (thrust neutrality), there arises the problem that the gas-bag fabric in the vicinity of the opening is greatly stressed by discharged gases.

It is known to provide a mounting made of sheet metal, which on the one hand holds the gas generator on the vehicle structure and, on the other hand, extends into the opening of the gas bag and partially surrounds the area of the discharge ports and thus protects the adjacent fabric.

Besides a relative high cost of assembly, this sheet metal element extending into the airbag has the disadvantage that it can damage the fabric of the airbag during the frequently long periods of time in which the airbag has been installed in the vehicle and is subjected to various shocks and vibrations. In the worst case, this may lead to failure of the airbag.

Proceeding herefrom, it is the object of the invention to provide an improved airbag module to reduce the potential for damage to the airbag during deployment.

SUMMARY OF THE INVENTION

According to the invention, an airbag module includes a gas-conducting element made of plastic connected to the fabric of the airbag in the area of a gas generator opening. To this end, the gas-conducting element is provided with an arcuate cross-section including an opening. Legs of the arcuate section are particularly suitable for connection to the fabric of the airbag, for example, by sewing.

By using a gas conducting element made from an appropriate plastic, polyamide or polypropylene for example, damage to the airbag fabric is prevented, even during lengthy storage. Elasticity may be maintained by choosing a suitable wall thickness, between, for example, 0.4 mm and 0.8 mm. In another example, the wall thickness may be between 1.5 mm and 2.5 mm.

In another embodiment, a gas generator is particularly easy to assemble into the airbag by providing a locking projection.

Another advantage of the airbag module according to the invention is that it prevents incorrect orientation of the gas-conducting element during final assembly.

Further objects, features and advantages of this invention will become readily apparent to persons skilled in the art after a review of the following description, with reference to the drawings and claims that are appended to and form a part of this specification.

DETAILED DESCRIPTION

Figure 1:
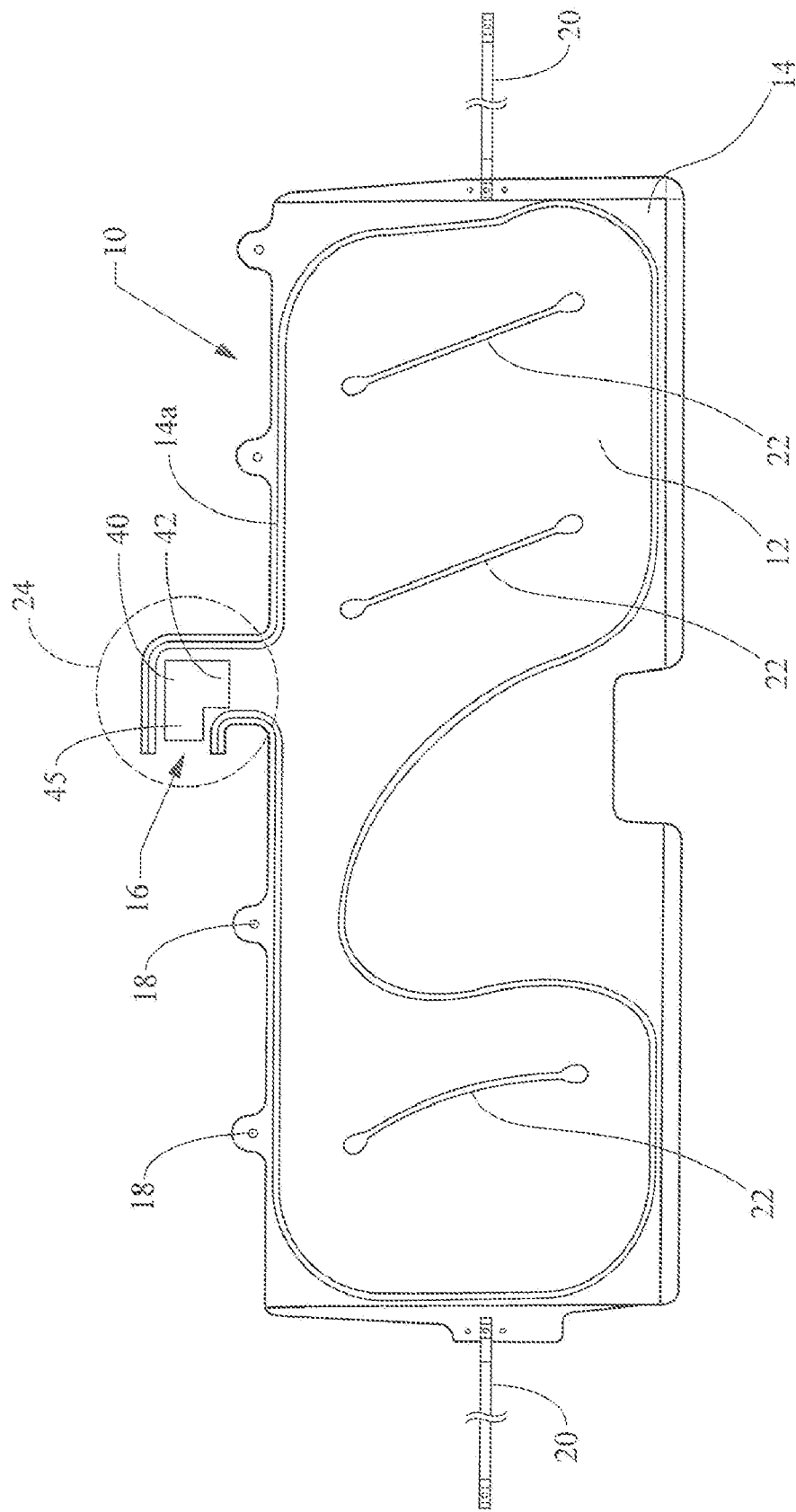
FIG. 1 is a longitudinal section through a side curtain airbag.

FIG. 1 depicts a longitudinal section through a side curtain airbag 10. The side curtain airbag 10 is provided with two side walls (of which a side wall 12 is shown), which are connected together in an edge region 14, for example, by sewing. An upper edge 14a of the edge region 14 includes an opening 16 for inserting a gas generator 30 (see FIG. 3) and tabs 18 for attaching the side curtain airbag 10 to a roof of a motor vehicle (not shown). The side curtain airbag 10 has intermediate seams 22 for contouring the airbag 10 and tethers 20 for positioning of the inflated airbag 10 in front of a side window of the motor vehicle.

An opening area 24 is L-shaped to permit the use of an elongated gas generator. The opening area 24 is approximately in the center of the top edge 14a and includes the opening 16 into the airbag 10. The gas generator 30 extends partially into the opening 16 and is arranged parallel to the longitudinal direction of the airbag 10.

A gas-conducting element 40 (illustrated schematically in FIG. 1) is provided within the L-shaped opening area 24. The gas-conducting element 40 is made of, for example, polyamide and is connected to the fabric of the airbag 10 in the opening area 24. The gas-conducting element 40 is connected inside the airbag 10, for example by sewing, when the airbag 10 is completed so that it can no longer slip to the side during final assembly. Sewing the gas-conducting element 40 in place is one method of connection, but the required connection can also be produced by welding or gluing.

Figure 2:
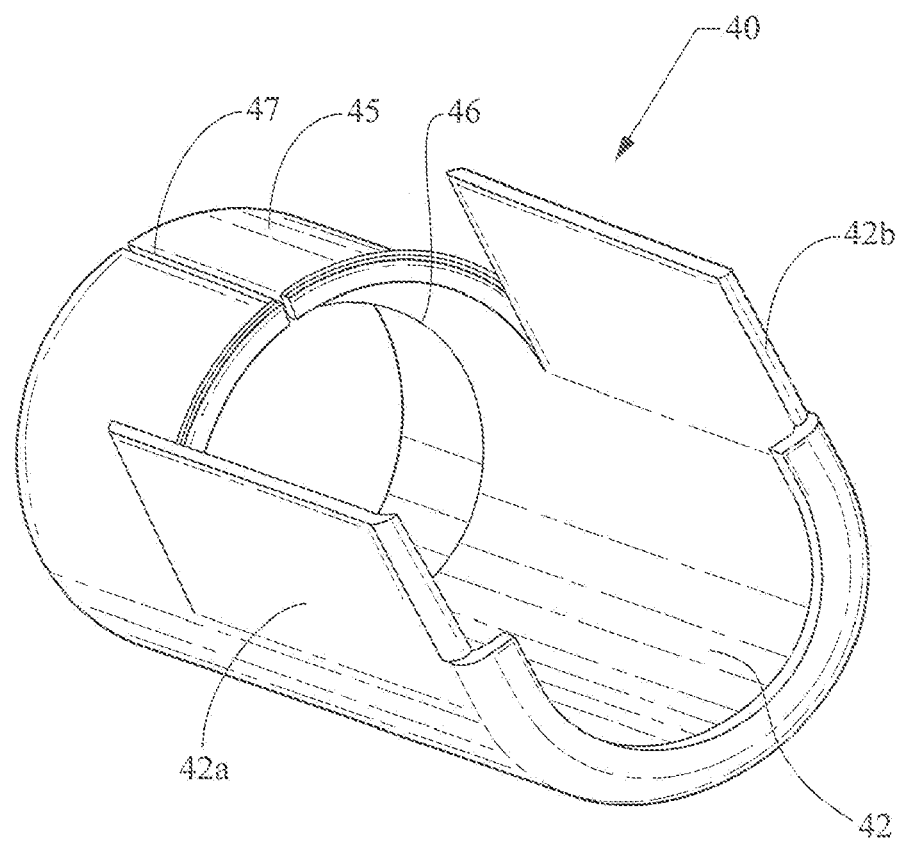
FIG. 2 is the gas-conducting element depicted in FIG. 1.

Turning to FIG. 2, the gas-conducting element 40 is provided with a forward section 42 and a rear section 45. The cross section of the forward section 42 is arcuate and includes an opening directed toward an interior of the airbag 10 when connected to the airbag 10. This results in a U-shaped cross section including two substantially parallel legs 42a and 42b. The gas-conducting element 40 is preferably sewn to the adjacent fabric in the area of the legs 42a and 42b.

FIG. 2 is a perspective illustration of the gas-conducting element 40. Here the rear section 45, has a substantially circular cross section. The forward section 42, which has the arcuate or U-shaped cross section discussed above, is also easily recognized. During assembly, the gas generator 30 (not shown) is pushed through the rear section 45 and locks into a locking projection 46. A slot 47 provides elasticity in the rear section 45 required for the locking projection 46 to function properly. The two legs 42a and 42b to which the airbag 10 is connected, are also shown.

Figure 3:
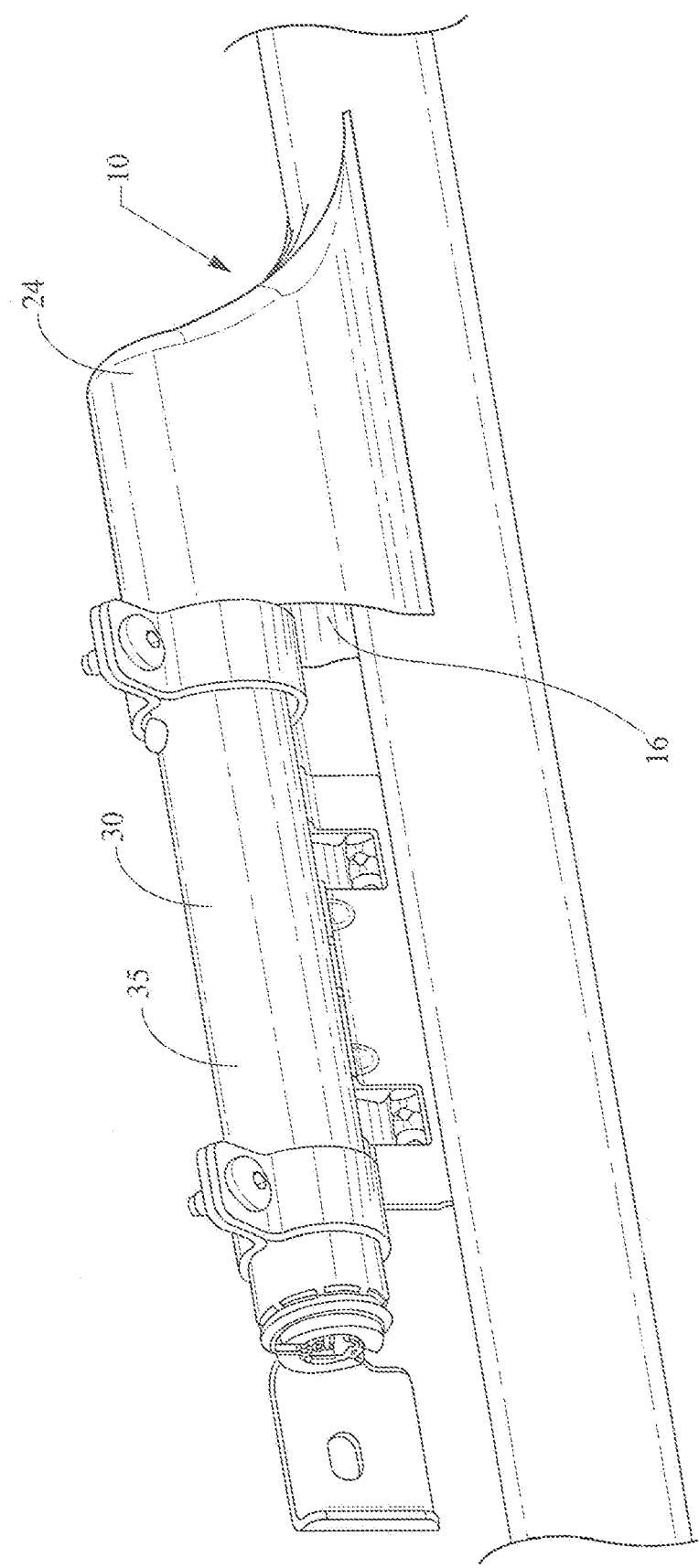
FIG. 3 is an opening area of the side curtain airbag including a gas generator.
Figure 4:
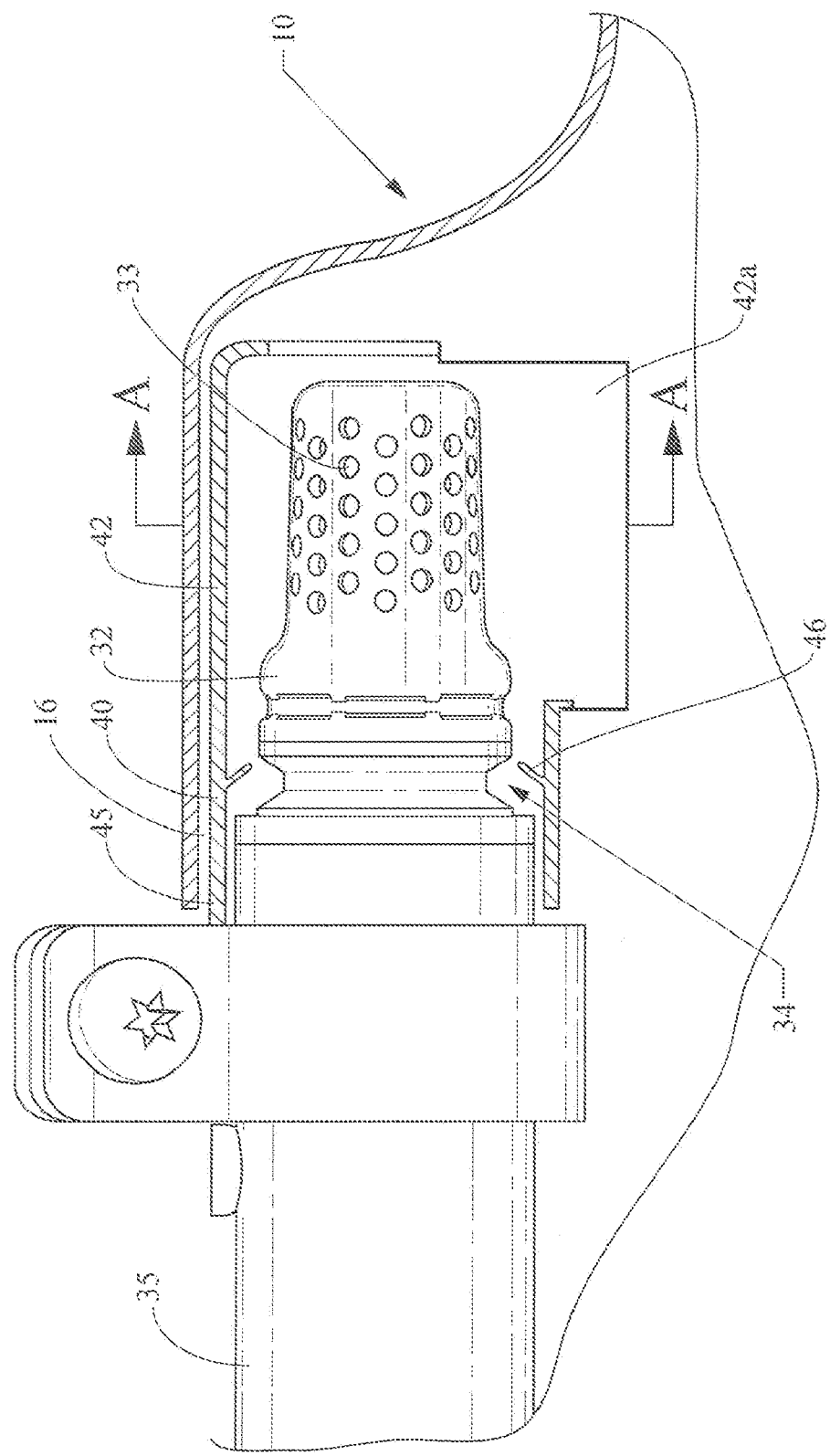
FIG. 4 is the gas generator of FIG. 3 shown inserted into the gas-conducting element of FIG. 2.

FIGS. 3 and 4 depict the gas generator 30 inserted into the opening 16 of the airbag 10. As can be seen, the gas generator 30 is elongated and rotationally symmetric. A first section 32 projects into the airbag 10 and is provided with discharge ports 33. The discharge ports 33 are partially surrounded by the forward section 42 of the gas-conducting element 40. The first section 32 is provided with a notch 34, which is mechanically coupled to the locking projection 46 of the gas-conducting element 40. The second section 35 is located outside of the airbag 10.

It would also be conceivable to use an angled gas generator (not shown) as long as the first section 32 projecting into the airbag 10 is similarly elongated.

Figure 4A:
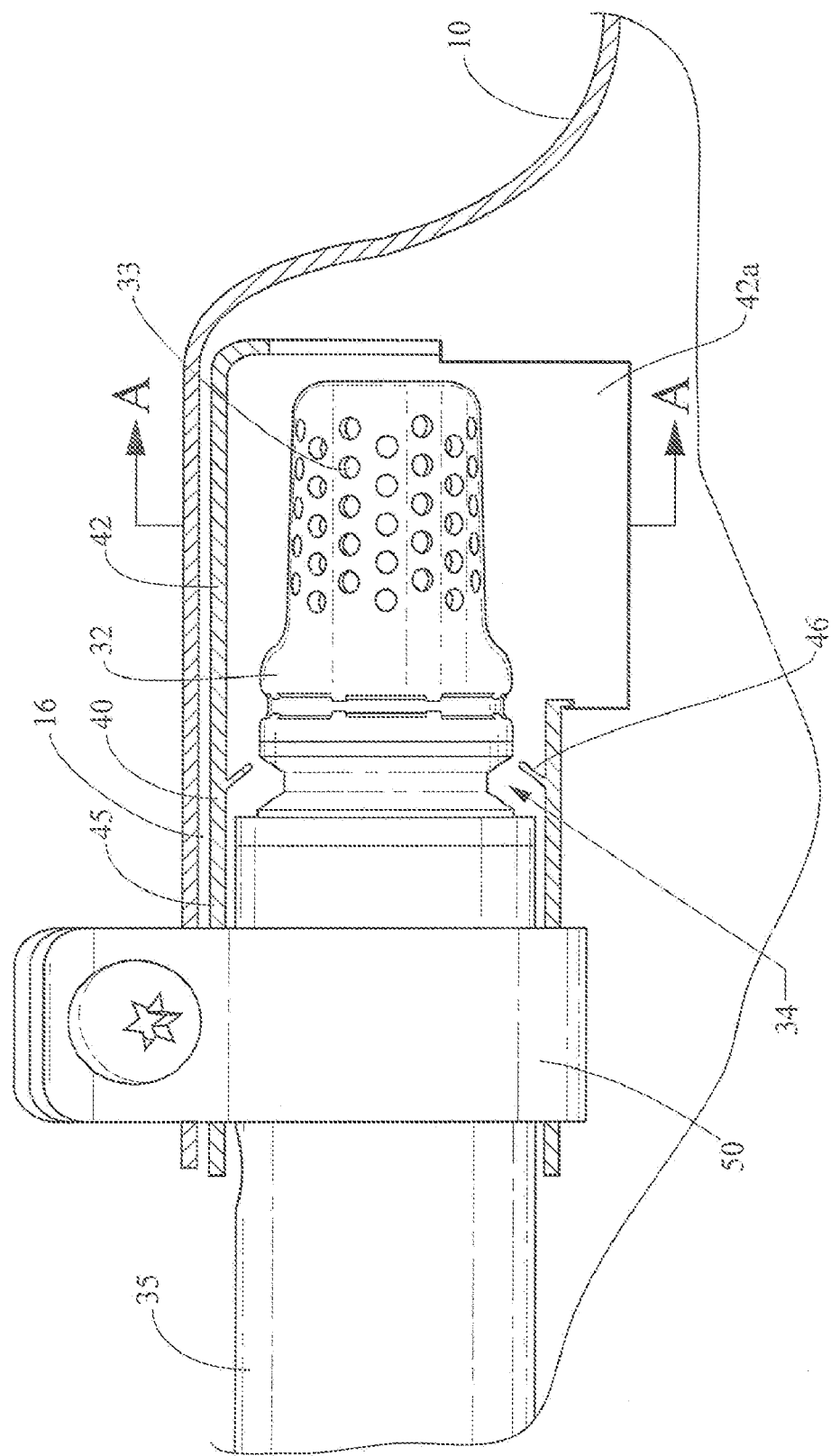
FIG. 4a is an alternate embodiment of FIG. 4.

FIG. 4a depicts a variation of the embodiment shown in FIG. 4. As in the other embodiments, the gas-conducting element 40 is connected directly to the fabric of the airbag 10 by either sewing, gluing or welding. This connection is in the area of the legs 42a and 42b. A strap 50, additionally secures the airbag 10 to the gas generator 30. The strap 50 clamps the rear section 45 of the gas-conducting element 40 to the second section 35 of the gas generator 30. The gas-conducting element 40 is thereby connected directly to the airbag 10 and to the gas generator 30. This arrangement increases the strength of the connection between the gas generator 30 and the airbag 10.

Figure 5:
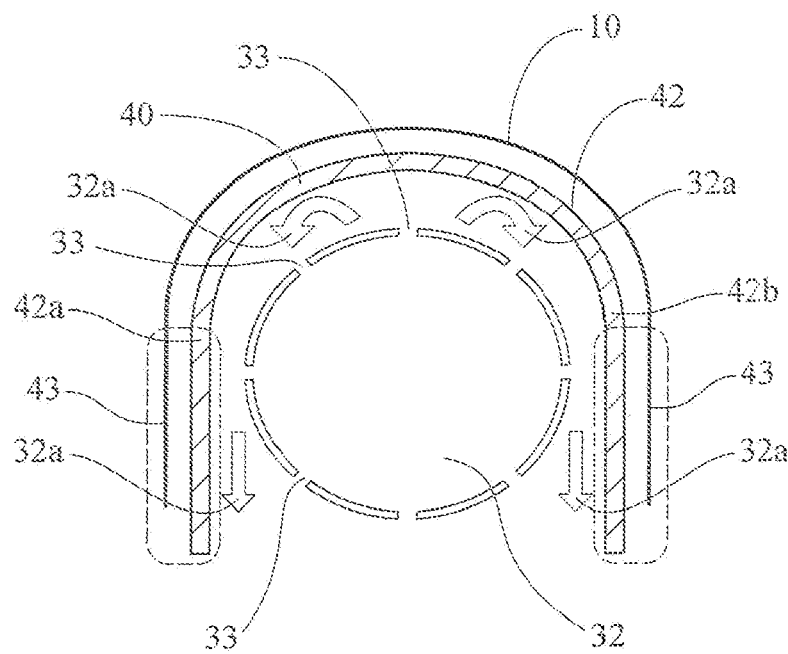
FIG. 5 is a longitudinal section along the plane A-A depicted in FIG. 4.

FIG. 5 depicts a longitudinal section through FIG. 4 or 4a along the sectional plane A-A. This view shows how the arcuate or U-shaped forward section 42 of the gas-conducting element 40 protects the fabric of the surrounding airbag 10 from a discharged gas 32a. The forward section of the gas-conducting element 40 surrounds a certain area of the external wall of the first section 32, so that the gas-conducting element 40 deflects the gas 32a flowing out of the discharge openings 33. The legs 42a and 42b direct the gas into the airbag 10. The gas 32a goes from the discharge ports located in the bottom section of the external wall into the airbag 10.

It is also possible to see the connecting areas 43 by which the legs 42a and 42b are connected to the fabric of the airbag 10. To simplify the connecting process, the legs 42a and 42b of an alternate embodiment of the forward section 42 of the gas-conducting element 40 can be arranged approximately perpendicular to a direction of gas flow from the arcuate portion of the forward section 42 to form an Ω-shaped cross section instead of the U-shaped cross section. Far ends of the D-shaped cross section are fastened to the fabric of the airbag 10.

The locking of the gas generator 30 into the locking projection 46 provides mechanic feedback during assembly to ensure that the gas generator is located in the correct axial position. Because of the rotationally symmetrical design of the gas generator, radial alignment of the gas generator with respect to the curtain gas bag is not an issue. This simplifies the assembly of the gas generator 30 into the side curtain airbag 10.

Figure 6A:
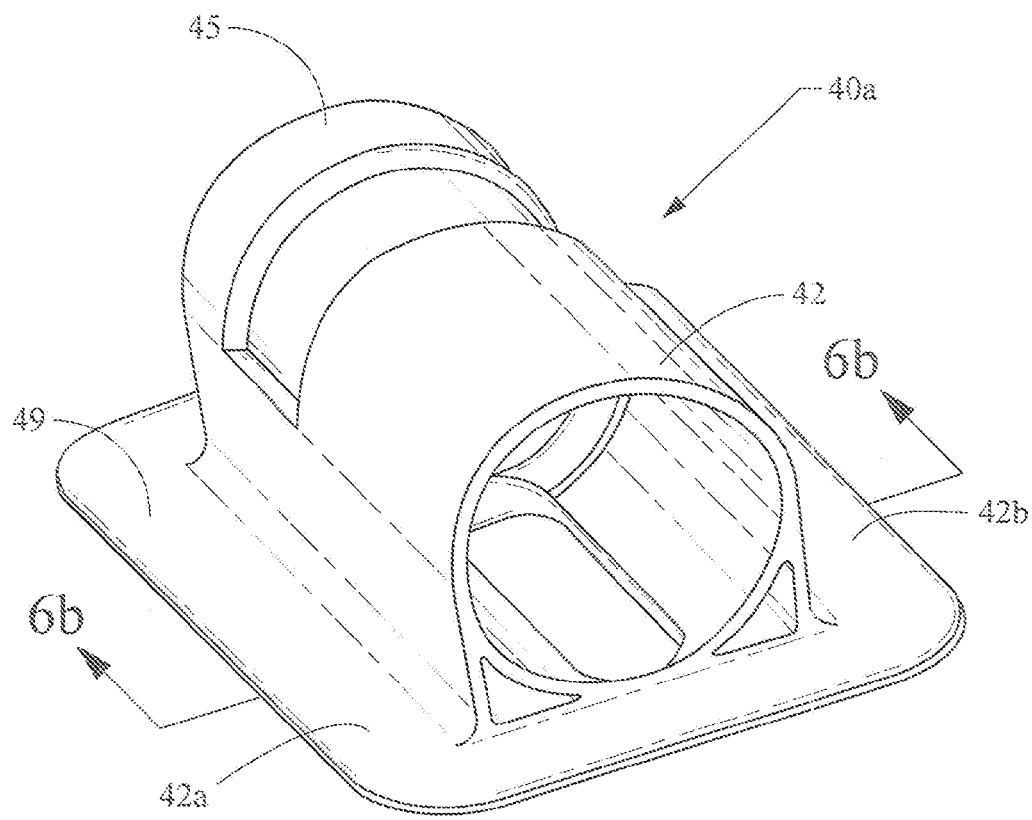
FIG. 6a is another exemplary embodiment of the gas-conducting element in a perspective view.
Figure 6B:
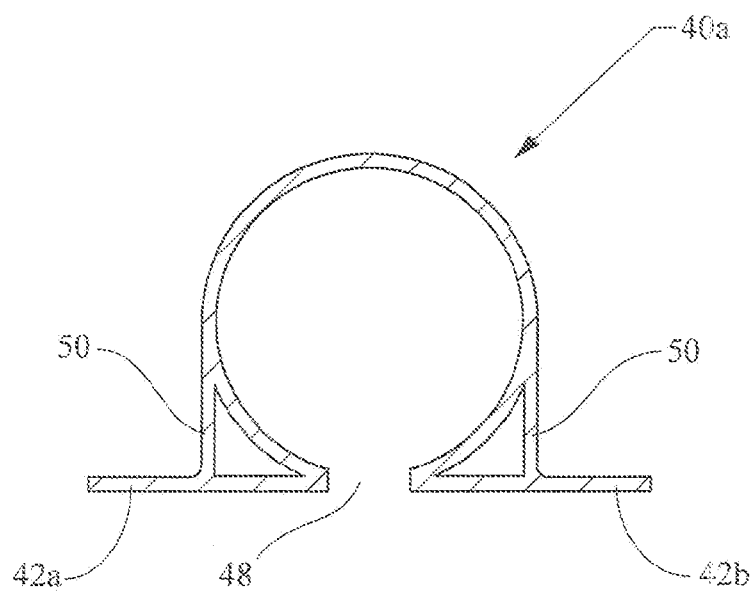
FIG. 6b is a longitudinal section through the gas-conducting element depicted in FIG. 6a along the plane E.

FIGS. 6a and 6b depict another exemplary embodiment of a gas-conducting element 40. FIG. 6b is a longitudinal section along the plane E through the forward section 42 of the gas-conducting element in FIG. 6a. In the gas-conducting element of this exemplary embodiment, both the forward section 42 and the rear section 45 are tubular. The forward section 42 is provided with an elongated hole 48 through which at least a portion of the gas coming from the gas generator 30 flows into the airbag 10. A base plate 49 is located in the plane of the elongated hole 48. A longitudinal section through the forward section 42, including the legs 42a and 42b projecting from the sides of the forward section 42, result in the Ω-shaped cross section shown in FIG. 6b. Braces 50 may optionally be provided to increase stability. Here the connection of the gas-conducting element 40a to the fabric of the airbag 10 is in the area of the legs 42a and 42b permitting the entire area of the base plate 49 to be connected to the airbag 10.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An airbag module comprising a planar airbag and an elongate gas generator including discharge ports at least partially extending into the airbag;

the airbag including two side walls connected together by an edge region and made of fabric;

an opening being disposed in the edge region of the airbag, the gas generator extending through the opening such that an elongate first section of the gas generator including the discharge ports is arranged inside the airbag; and a gas-conducting element being positioned inside the airbag adjacent the opening to protect the fabric from hot gasses discharged from the discharge ports, the gas-conducting element being made of plastic and including a forward section having an arcuate cross section including an opening formed between at least two substantially parallel legs, and the gas-conducting element being connected to the fabric.

2. The airbag module according to claim 1, wherein the legs of the forward section of the gas-conducting element are connected to the fabric.

3. The airbag module according to claim 2, wherein the legs are sewn to the fabric.

4. The airbag module according to claim 1, wherein a second section of the gas generator is disposed outside of the airbag.

5. The airbag module according to claim 4, wherein the gas-conducting element includes a rear section having a substantially circular cross section.

6. The airbag module according to claim 5, wherein a strap attaches the rear section of the gas-conducting element to the second section of the gas generator.

7. The airbag module according to claim 5, wherein the rear section is provided with at least one locking projection for securing the gas generator into place.

8. The airbag module according to claim 1, wherein the plastic of the gas-conducting element includes polyamide.

9. The airbag module according to claim 1, wherein the gas-conducting element includes a wall thickness between 0.4 and 0.8 mm.

10. The airbag module according to claim 9, wherein the wall thickness is between 1.5 and 2.5 mm.

11. The airbag module according to claim 1, wherein the discharge ports are disposed rotationally symmetric in a cylindrical external wall of the first section of the gas generator.

12. The airbag module according to claim 1, wherein the edge region of the airbag includes an L-shaped portion adjacent the opening.

13. The airbag module according to claim 1, wherein the gas-conducting element is connected to the fabric by sewing, welding or gluing.

14. The airbag module according to claim 1, wherein the plastic of the gas-conducting element includes a polypropylene.

15. The airbag module according to claim 1, wherein the forward cross-section is U-shaped.

* * * * *